(12) United States Patent
Vogel et al.

(10) Patent No.: US 6,819,842 B1
(45) Date of Patent: Nov. 16, 2004

(54) AERIAL FIBER OPTIC SYSTEM INCLUDING A SUB-DISTRIBUTION SYSTEM AND RELATED METHODS

(75) Inventors: Mark O. Vogel, Statesville, NC (US); Christopher P. Gemme, Hickory, NC (US); Mark E. Alrutz, Hickory, NC (US); Martin B. Lee, Denver, NC (US)

(73) Assignee: Commscope Properties, LLC, Sparks, NV (US)

( * ) Notice: Subject to any disclaimer, the term of this patent is extended or adjusted under 35 U.S.C. 154(b) by 0 days.

(21) Appl. No.: 10/640,813

(22) Filed: Aug. 14, 2003

(51) Int. Cl.[7] .............................. G02B 6/44; G02B 6/00
(52) U.S. Cl. ........................................ 385/100; 385/135
(58) Field of Search ................................ 385/100, 135, 385/139, 147; 439/502

(56) References Cited

U.S. PATENT DOCUMENTS

| | | | |
|---|---|---|---|
| 4,462,655 A | | 7/1984 | Campbell et al. .............. 339/98 |
| 4,711,517 A | | 12/1987 | Fentress et al. ............ 350/96.2 |
| 5,029,958 A | * | 7/1991 | Hodge et al. ................ 385/100 |
| 5,121,458 A | | 6/1992 | Nilsson et al. .............. 385/100 |
| 5,253,315 A | | 10/1993 | Fentress ....................... 385/78 |
| 6,400,863 B1 | * | 6/2002 | Weinstock et al. ............. 385/24 |
| 6,427,035 B1 | | 7/2002 | Mahony ....................... 385/15 |
| 6,427,042 B1 | | 7/2002 | Dyke et al. ................. 385/100 |
| 6,711,337 B2 | * | 3/2004 | Hodge et al. ............... 385/135 |
| 6,746,161 B2 | * | 6/2004 | Imamura ...................... 385/88 |
| 2003/0063843 A1 | * | 4/2003 | Horne .......................... 385/24 |

* cited by examiner

*Primary Examiner*—Chandrika Prasad
(74) *Attorney, Agent, or Firm*—Allen, Dyer, Doppelt, Milbrath & Gilchrist, P.A.

(57) ABSTRACT

An aerial fiber optic cable system includes a distribution cable extending along an aerial route, a splice enclosure connected to the distribution cable along the aerial route, and a first sub-distribution fiber optic system extending along the aerial route in a first direction away from the fiber optic splice enclosure. The first sub-distribution system may include spaced apart fiber optic taps along the aerial route, a first sub-distribution fiber optic cable between the fiber optic splice enclosure and a first fiber optic tap, and at least one second sub-distribution fiber optic cable between adjacent fiber optic taps so that the first sub-distribution fiber optic cable and the at least one second sub-distribution fiber optic cable are arranged in end-to-end relation. The system may also or alternately include a similar lateral sub-distribution system.

51 Claims, 5 Drawing Sheets

AERIAL FIBER OPTIC SYSTEM INCLUDING A SUB-DISTRIBUTION SYSTEM AND RELATED METHODS

FIELD OF THE INVENTION

The present invention relates to the field of communications systems, and, more particularly, to the field of fiber optic communications systems, such as installed along aerial routes, for example, and associated methods.

BACKGROUND OF THE INVENTION

Some cable television systems in the past have used exclusively electrical coaxial cables to distribute TV signals from a headend to a plurality of individual subscribers. A main distribution coaxial cable extended along a route, and a series of taps were connected to the main distribution cable along the route. One or more coaxial drop cables extended outwardly from the taps to the individual subscribers.

Fiber optic cables are widely used for transmitting telecommunications signals over relatively long distances, and at higher data rates than electrical cables, such as coaxial cables. Fiber optic cables also offer immunity to lightning and other potential electrical faults along the route. A typical fiber optic cable includes a plurality of individual optical fibers contained within a protective sheath. Fiber optic cables are now commonly used in hybrid fiber/coax systems where the main, or trunk, cable is fiber/coax systems where the main, or trunk, cable is provided by an optical fiber cable.

Newer cable television systems are employing fiber optic cables throughout and are sometimes referred to as "fiber-in-the-loop" (FITL) systems. In other words, even the drop cables that extend to the individual subscribers are provided by optical fiber cables in an FITL system. Unfortunately, one drawback of a conventional FITL system is that the main distribution cable must be entered, the fibers accessed, spliced/interconnected and stored within a splice enclosure, and the entire assembly protected at each drop location along the route. This results in relatively high labor costs and material costs for the drop locations.

In addition, the splice enclosure is opened each time an additional subscriber is added to the system. This exposes the components to the risk of accidental damage.

U.S. Pat. No. 6,427,035 B1 to Mahony discloses a fiber optic network for connecting subscribers to a central office of the telephone service provider. The network includes a so-called "splitter-terminal apparatus" for connecting a plurality of drop cables to a secondary cable that, in turn, is connected to the primary cable. The splitter-terminal apparatus includes a housing, a splitter, and a plurality of connectorized terminations. Unfortunately, each tap is connected to the secondary cable at a conventional splice enclosure.

SUMMARY OF THE INVENTION

In view of the foregoing background, it is therefore an object of the present invention to provide a fiber optic communication system having a relatively low installation cost, a relatively low cost to add additional subscribers, and that reduces exposure of the distribution cable to damage.

These and other objects, features, and advantages of the present invention are provided by an aerial fiber optic cable system comprising a sub-distribution fiber optic system associated with the distribution fiber optic cable. More specifically, the aerial fiber optic cable system may comprise a distribution fiber optic cable extending along an aerial route, at least one fiber optic splice enclosure connected to the distribution fiber optic cable along the aerial route, and the sub-distribution fiber optic system extending along the aerial route in a direction away from the fiber optic splice enclosure.

The sub-distribution fiber optic system may comprise a plurality of spaced apart fiber optic taps along the aerial route, and a first sub-distribution fiber optic cable extending along the aerial route between the fiber optic splice enclosure and a first one of the plurality of fiber optic taps. The first sub-distribution fiber optic system may also comprise at least one second sub-distribution fiber optic cable extending along the aerial route between adjacent fiber optic taps so that the first sub-distribution fiber optic cable and the at least one second sub-distribution fiber optic cable are arranged in end-to-end relation. Drop fiber optic cables may extend away from the aerial route at each fiber optic tap.

Each of the sub-distribution fiber optic cables may comprise a desired length of cable and a fiber optic cable connector on at least one end thereof. Each fiber optic cable connector may comprise a factory installed fiber optic cable connector. In other words, pre-connectorized fiber optic cables may be used for the first and at least one second sub-distribution cables. Accordingly, the installation may be simplified and the cost reduced.

Each of the fiber optic taps may comprise a tap housing, and an input fiber optic connector carried by the tap housing for coupling to a preceding sub-distribution fiber optic cable. The fiber optic taps may also comprise an output fiber optic connector carried by the tap housing for coupling to a succeeding sub-distribution fiber optic cable, and a plurality of drop fiber optic connectors carried by the tap housing for coupling to respective drop fiber optic cables. The tap housing may also carry a fiber optic splitter, for example. The taps permit additional subscribers to be later added and without exposing the distribution cable to potential damage.

The aerial fiber optic cable system may further comprise a second sub-distribution fiber optic system extending along the aerial route in a second direction opposite the first direction. The first direction may be considered the forward direction, and the second direction a backward direction, for example. Accordingly, the fiber optic system may advantageously be extended over a greater range.

In accordance with another aspect of the invention, the aerial fiber optic cable system in some embodiments may include a lateral sub-distribution fiber optic system extending outwardly from the aerial route in a lateral direction away from the at least one splice enclosure. The lateral sub-distribution system may include a plurality of spaced apart fiber optic taps, with each tap comprising a tap housing and a plurality of tap fiber optic connectors carried thereby. The lateral sub-distribution system may also include a first lateral sub-distribution fiber optic cable extending between the at least one splice enclosure and a first one of the fiber optic taps, and at least one second lateral sub-distribution fiber optic cable extending between adjacent fiber optic taps. Accordingly, the first lateral sub-distribution fiber optic cable and the at least one second lateral sub-distribution fiber optic cable are arranged in end-to-end relation. In addition, the first lateral sub-distribution fiber optic cable and the at least one second lateral sub-distribution fiber optic cable may each comprise a pre-connectorized fiber optic cable.

The fiber optic cable system may also comprise a plurality of spaced apart vertical support structures, such as wooden utility poles, for example, defining the aerial route. A respective optical network unit may be connected to each drop fiber optic cable at the subscriber's location.

A method aspect of the present invention is for installing an aerial fiber optic cable system. The method may comprise installing a fiber optic distribution cable along an aerial route, connecting at least one fiber optic splice enclosure to the fiber optic distribution cable along the aerial route, and installing a first fiber optic sub-distribution system extending along the aerial route in a first direction away from the at least one fiber optic splice enclosure.

Another method aspect of the present invention is also for installing an aerial fiber optic cable system, and may include installing a fiber optic distribution cable along an aerial route, and connecting at least one fiber optic splice enclosure to the fiber optic distribution cable along the aerial route. The method may also comprise installing a forward sub-distribution fiber optic system extending along the aerial route in a forward direction away from the at least one fiber optic splice enclosure, and installing a backward sub-distribution fiber optic system extending along the aerial route in a backward direction.

Yet another method aspect is also for installing an aerial fiber optic cable system. The method may include connecting at least one fiber optic splice enclosure to a fiber optic distribution cable along an aerial route, and installing a lateral fiber optic sub-distribution system extending outwardly from the aerial route in a lateral direction away from the at least one fiber optic splice enclosure.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
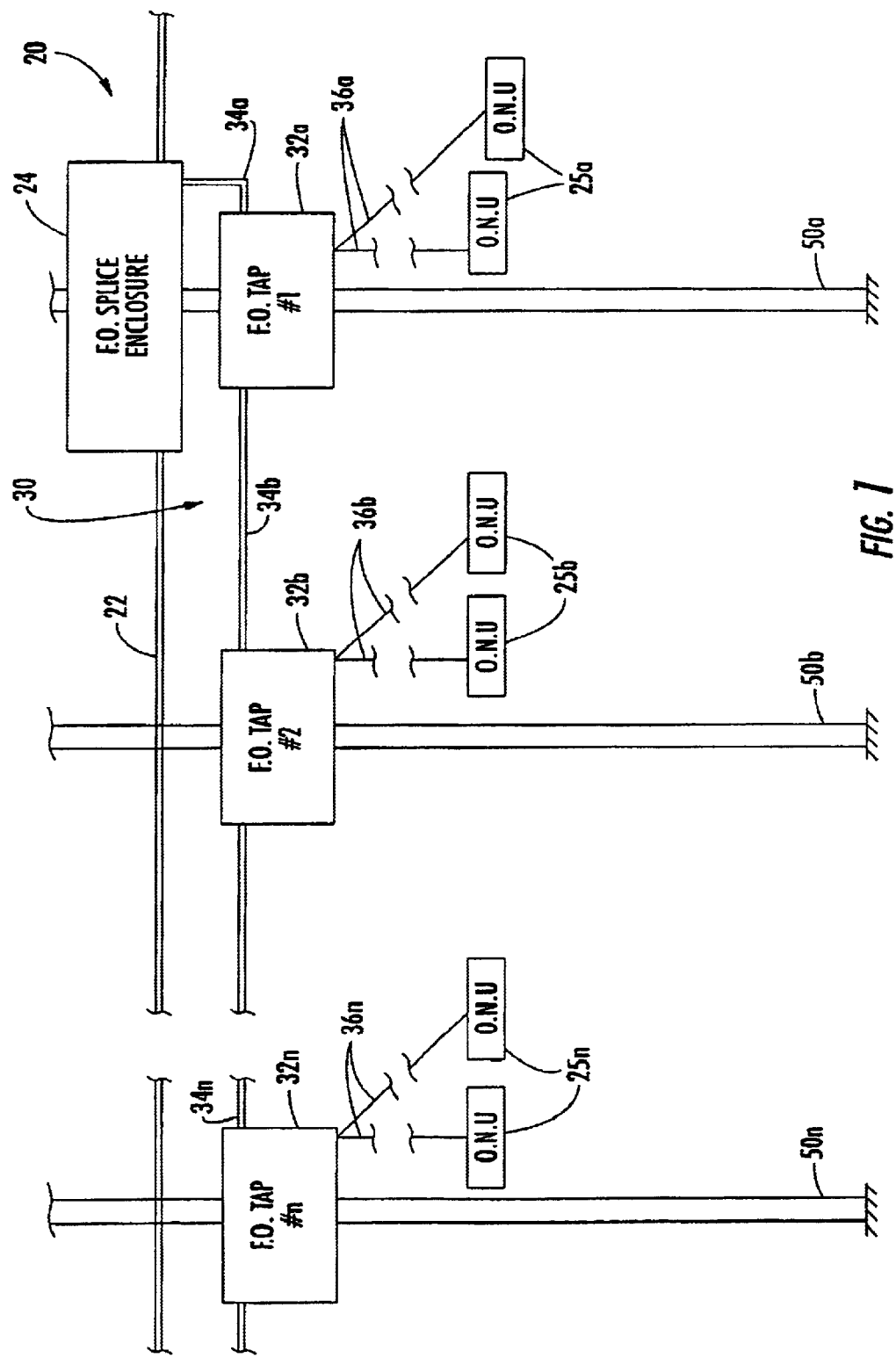
FIG. 1 is a schematic diagram of an aerial fiber optic cable system according to the present invention.
Figure 2A:
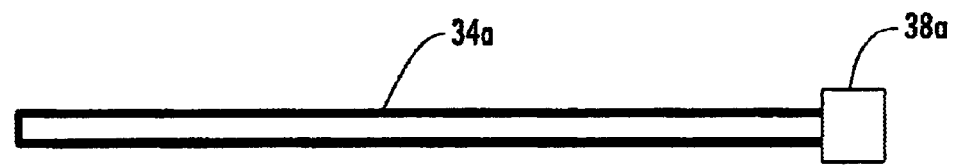
FIG. 2a is a schematic diagram of a sub-distribution fiber optic cable shown in FIG. 1.
Figure 2B:
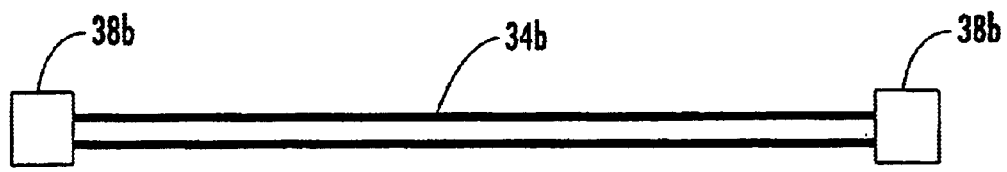
FIG. 2b is a schematic diagram of another sub-distribution fiber optic cable shown in FIG. 1.
Figure 3:
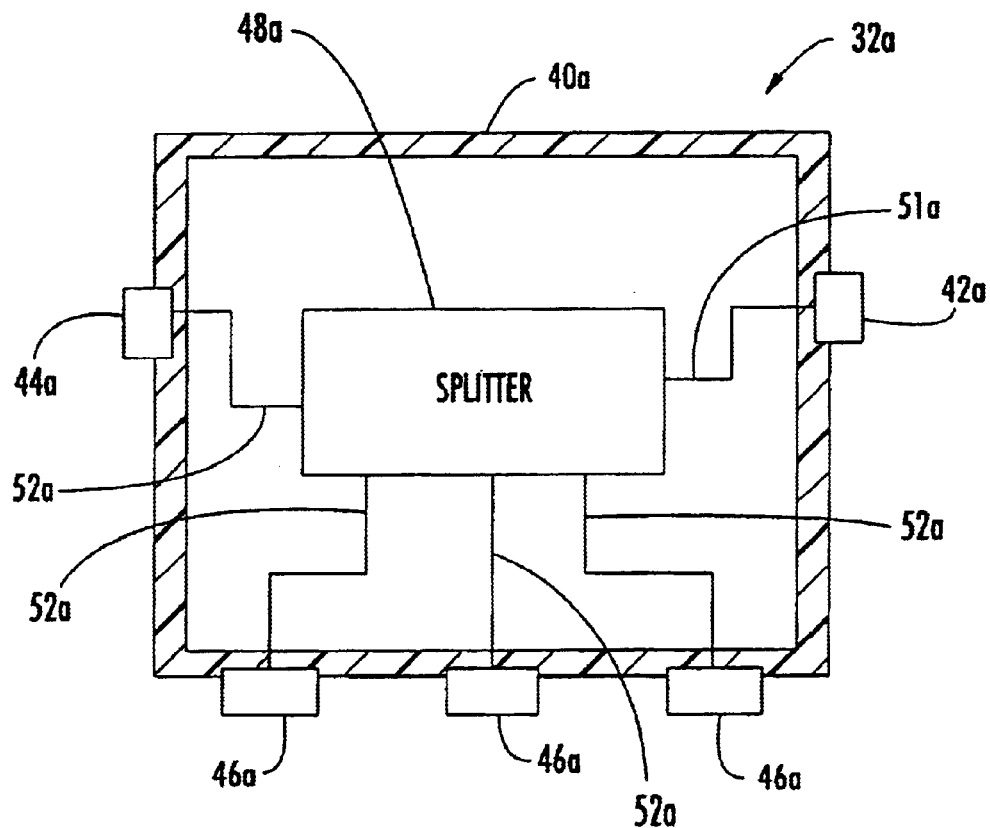
FIG. 3 is a schematic diagram of the tap housing shown in FIG. 1.

Referring to FIGS. 1–3, an aerial fiber optic cable system 20 is now described. The aerial fiber optic cable system 20 illustratively comprises a distribution fiber optic cable 22 extending along an aerial route. A fiber optic splice enclosure 24 is illustratively connected to the distribution fiber optic cable 22 along the aerial route.

The aerial fiber optic cable system 20 also illustratively comprises a sub-distribution fiber optic system 30 extending along the aerial route away from the fiber optic splice enclosure 24. The sub-distribution fiber optic system 30 illustratively comprises a plurality of spaced apart fiber optic taps 32a–32n along the aerial route. The sub-distribution fiber optic system 30 also illustratively comprises a plurality of sub-distribution fiber optic cables 34a–34n. A first one of the plurality of sub-distribution fiber optic cables 34a illustratively extends along the aerial route between the fiber optic splice enclosure 24 and a first one of plurality of fiber optic taps 32a.

A plurality of second sub-distribution cables 34b–34n illustratively extends between adjacent fiber optic taps 32a–32n. Accordingly, the plurality of sub-distribution fiber optic cables 34a–34n is arranged in end-to-end relation. A respective plurality of drop fiber optic cables 36a–36n illustratively extends away from the aerial route at each of the plurality of fiber optic taps 32a–32n. Accordingly, the respective plurality of fiber optic drop cables 36a–36n may advantageously be connected to the distribution cable 22 without exposing the distribution cable for another splice, or without opening the fiber optic splice enclosure 24.

Referring now-more specifically to FIGS. 2a and 2b, the first and second sub-distribution fiber optic cables 34a, 34b are now described in greater detail. The first and second sub-distribution fiber optic cables comprise a desired length of cable. The first sub-distribution fiber optic cable 34a illustratively includes a fiber optic connector 38a on one end thereof. The second sub-distribution fiber optic cable 34b illustratively includes a fiber optic connector on each of the opposing ends thereof. The sub-distribution fiber optic cables 34a, 34b may be pre-connectorized fiber optic cables. Each of the fiber optic cable connectors 38a, 38b may comprise a factory installed fiber optic cable connector. Those skilled in the art will appreciate, however, that the fiber optic connectors 38a, 38b may also be installed in the field, if so desired, but this may lead to higher installation costs.

Referring now more specifically to FIG. 3, one of the plurality of fiber optic taps 32a is now described in greater detail. The fiber optic tap 32a illustratively comprise a tap housing 40a. An input fiber optic connector 42a is illustratively carried by the tap housing 40a for coupling to the sub-distribution fiber optic cable 34a located before or preceding the tap housing. The tap housing 40a may be made of a plastic or a composite material, for example, or any other type of high strength material. An output fiber optic connector 44a is illustratively carried by the tap housing 40a for coupling to the fiber optic cable 34b located after or succeeding from the tap housing. A plurality of drop fiber optic connectors 46a are illustratively carried by the tap housing 40a for coupling to respective drop fiber optic cables 36a.

As will be appreciated by those skilled in the art, rather than have the connectors 46a carried by the housing, the connectors may be located within the housing 40a in other embodiments. In other words, pigtails may extend into the housing 40a and the optical connections made internal to the housing. This may reduce the need to provide a mechanical connection and environmental seal along with making the optical connection, as the mechanical connection and environmental seal may be made at the housing 40a while the optical connection is internal to the housing.

The fiber optic tap 32a illustratively comprises a fiber optic splitter 48a carried by the tap housing 40a. The fiber optic splitter 48a illustratively comprises a splitter input fiber 51a connected to the input fiber optic connector 42a. The fiber optic splitter 48a also comprises a plurality of splitter output fibers 52a. One splitter output fiber 52a is illustratively connected to the output fiber optic connector 44a. The remaining splitter output fibers 52a are illustratively connected to the respective plurality of fiber optic connectors 46a.

Those of skill in the art will recognize that in other embodiments, a wavelength-division-multiplexer (WDM) device may be substituted for the splitter 48a. In yet other embodiments, a WDM device may be used in combination with a splitter. Of course, other passive and/or active components may be provided within the housing 40a.

The fiber optic tap 32a illustrated in FIG. 3 is the first fiber optic tap. Those skilled in the art will appreciate, however, that all of the fiber optic taps 32b–32n are similar to the first fiber optic tap 32a and require no further discussion herein.

The aerial fiber optic cable system 20 further illustratively comprises a plurality of spaced apart vertical support structures 50a–50n defining the aerial route. The vertical support structures 50a–50n may, for example, be wooden utility poles, or other vertical supports, as understood by those skilled in the art. The vertical support structures 50a–50n illustratively carry the distribution fiber optic cable 22 and the sub-distribution fiber optic system 30. Optical network units 25a–25n are illustratively connected to the respective drop fiber optic cable 36a–36n.

Figure 4:
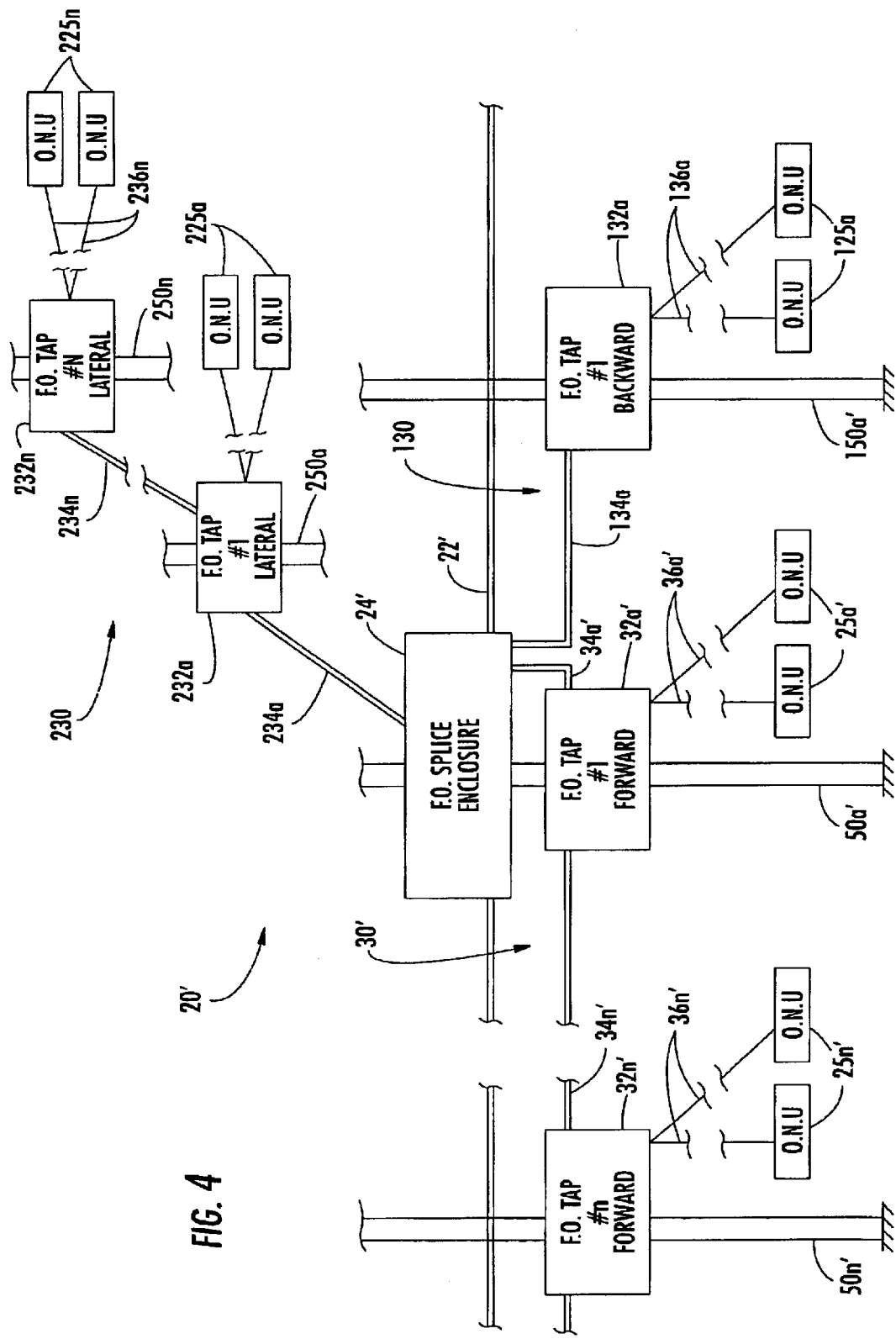
FIG. 4 is a schematic diagram of another embodiment of an aerial fiber optic cable system according to the present invention.

Referring now additionally to FIG. 4, a second embodiment of the aerial fiber optic cable system 20' according to the present invention is now described. The second embodiment of the aerial fiber optic cable system 20' illustratively includes a first sub-distribution fiber optic system 30' extending in a first or forward direction along the aerial route, and a second sub-distribution fiber optic system 130 extending in a second or backward direction along the aerial route opposite the first direction. This advantageously allows for a broader range of connection to the distribution cable 22'. The elements of the system 20' of the backward sub-distribution system 130 are indicated by reference numbers incremented by one hundred for simplicity of explanation. The other elements of the second embodiment of the aerial fiber optic cable system 20' are similar to those of the first embodiment 20, are labeled with prime notation, and require no further discussion herein.

Another aspect of the system 20' illustrated in FIG. 4 relates to a lateral sub-distribution system 230 extending outwardly from the aerial route in a lateral direction away from the splice enclosure 24'. The lateral sub-distribution system 230 illustratively includes a plurality of spaced apart fiber optic taps 232a–232n, carried by respective poles 250a, 250n, and wherein each tap includes a tap housing and a plurality of tap fiber optic connectors carried thereby as described above.

The lateral sub-distribution system 230 includes a first lateral sub-distribution fiber optic cable 234a extending between the splice enclosure 24' and a first fiber optic tap 232a, and at least one second lateral sub-distribution fiber optic cable 234n extending between adjacent fiber optic taps. Accordingly, the first lateral sub-distribution fiber optic cable 234a and the at least one second lateral sub-distribution fiber optic cable 234n are arranged in end-to-end relation.

The lateral sub-distribution fiber optic cables 234a, 234n may each comprise a pre-connectorized fiber optic cable. Drop cables 236a connect the first lateral tap 232a to the optical network units 225, and drop cables 236n connect the last lateral tap 232n to the optical network units 235n. As will be appreciated by those skilled in the art, portions of the forward and backward sub-distribution systems 30', 130 may also extend laterally outwardly similar to the lateral sub-distribution system 230. The other elements of the second embodiment of the aerial fiber optic cable system 20' are similar to those of the first embodiment 20, are labeled with prime notation, and require no further discussion herein.

Figure 5:
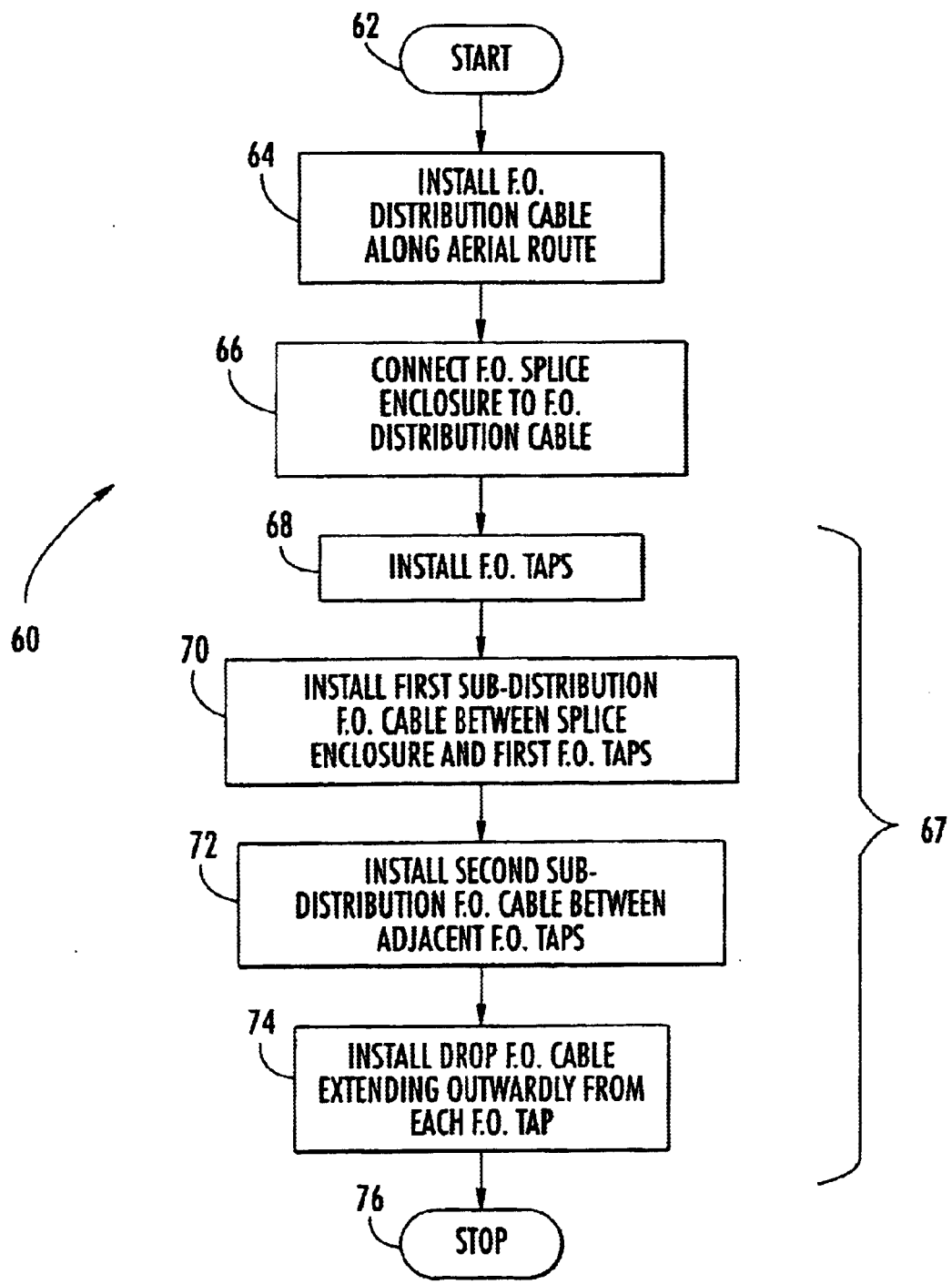
FIG. 5 is a flow chart illustrating a method of installing the fiber optic cable system shown in FIG. 1.

Referring now additionally to the flow chart 60 of FIG. 5, a method for installing an aerial fiber optic cable system 20 is now described. From the start (Block 62), a fiber optic distribution cable 22 is installed along an aerial route at Block 64. At Block 66, a fiber optic splice enclosure 24 is connected to the fiber optic distribution cable 22 along the aerial route.

The blocks generally labeled as 67 represent installing a fiber optic sub-distribution system 30 extending along the aerial route in a direction away from the fiber optic splice enclosure 24. More specifically, at Block 68, a plurality of spaced apart fiber optic taps 32a–32n is installed along the aerial route. At Block 70, a first sub-distribution fiber optic cable 34a is installed between the fiber optic splice enclosure 24 and a first one of the plurality of fiber optic taps 32a. At Block 72, at least one second sub-distribution fiber optic cable 34b is installed between adjacent fiber optic taps 32a–32n so that the sub-distribution fiber optic cables are arranged in end-to-end relation. At Block 74, at least one respective drop fiber optic cable 36 is installed to extend outwardly from each of the fiber optic taps 32a–32n before completing installation at Block 76. Those of skill in the art will also appreciate that a similar method may be used to install the lateral sub-distribution system 230 described above with reference to FIG. 4.

Figure 6:
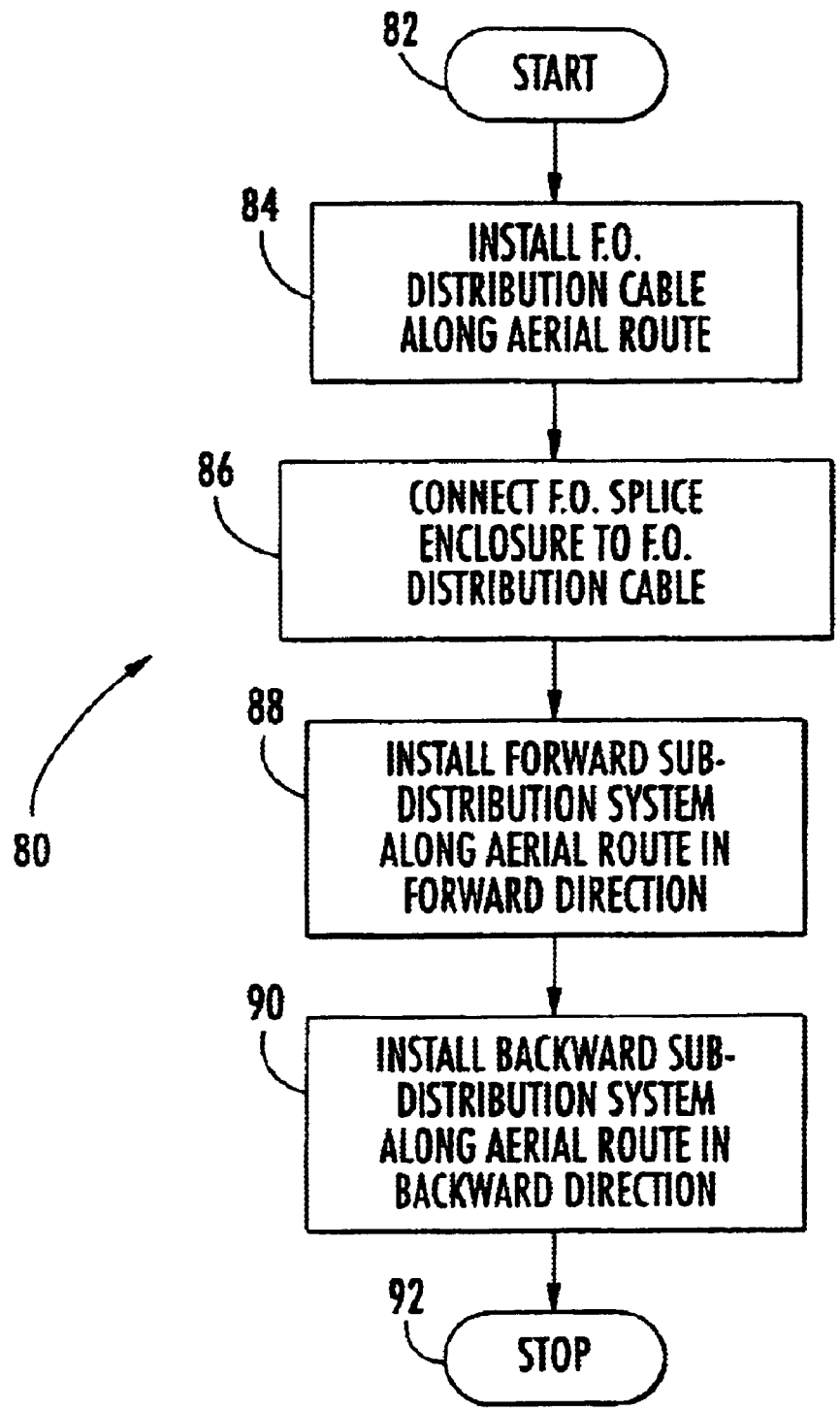
FIG. 6 is a flow chart illustrating a method of installing the fiber optic cable system shown in FIG. 4.

Referring now additionally to the flow chart 80 of FIG. 6, another method aspect for installing an aerial fiber optic cable system 20' of FIG. 4 is now described. From the start (Block 82), a fiber optic distribution cable 22' is installed along an aerial route at Block 84. At Block 86, a fiber optic splice enclosure 24' is connected to the fiber optic distribution cable 22' along the aerial route. At Block 88, a forward sub-distribution fiber optic system 30' is installed along the aerial route in a forward direction away from the at least one fiber optic splice enclosure 24'. At Block 90, a backward sub-distribution fiber optic system 130 is installed along the aerial route in a backward direction before completing installation at Block 92. Installing the forward sub-distribution fiber optic system 30' and the backward sub-distribution fiber optic system 130 each comprises installing at least one fiber optic tap 32a', 132a along the aerial route, and installing a first sub-distribution fiber optic cable 34a', 134a extending along the aerial route between the at least one fiber optic splice enclosure 24' and a first fiber optic tap 32a', 132a.

In other embodiments, any of the sub-distribution systems may be installed onto an existing fiber optic distribution cable as will be appreciated by those skilled in the art. Other aspects of the cable system may be understood with reference to copending patent application Ser. No. 10/640,905 entitled "BURIED FIBER OPTIC SYSTEM INCLUDING A SUB-DISTRIBUTION SYSTEM AND RELATED METHODS", and the entire disclosure of which is incorporated by reference herein.

Those of skill in the art will appreciate that the concepts for fiber optic sub-distribution arrangements as described herein may also be implemented in a building structure, for example. The main distribution fiber optic cable may extend vertically within the building structure, and the various sub-distribution systems connected thereto to service different building floors, and/or various locations at a given floor. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. An aerial fiber optic cable system comprising:
    a distribution fiber optic cable extending along an aerial route;
    at least one fiber optic splice enclosure connected to said distribution fiber optic cable along the aerial route; and
    a first sub-distribution fiber optic system extending along the aerial route in a first direction away from said at least one fiber optic splice enclosure and comprising
        a plurality of spaced apart fiber optic taps along the aerial route,
        a first sub-distribution fiber optic cable extending along the aerial route between said at least one fiber optic splice enclosure and a first one of said plurality of fiber optic taps,
        at least one second sub-distribution fiber optic cable extending along the aerial route between adjacent fiber optic taps so that said first sub-distribution fiber optic cable and said at least one second sub-distribution fiber optic cable are arranged in end-to-end relation, and
        at least one drop fiber optic cable extending away from the aerial route at at least one of said fiber optic taps.

2. An aerial fiber optic cable system according to claim 1 wherein each of said sub-distribution fiber optic cables comprises a desired length of cable and a fiber optic cable connector on at least one end thereof.

3. An aerial fiber optic cable system according to claim 2 wherein each fiber optic cable connector comprises a factory installed fiber optic cable connector.

4. An aerial fiber optic cable system according to claim 1 wherein each of said fiber optic taps comprises:
    a tap housing;
    an input fiber optic connector carried by said tap housing for coupling to a preceding sub-distribution fiber optic cable;
    an output fiber optic connector carried by said tap housing for coupling to a succeeding sub-distribution fiber optic cable; and
    a plurality of drop fiber optic connectors carried by said tap housing for coupling to respective drop fiber optic cables.

5. An aerial fiber optic cable system according to claim 4 wherein each of said fiber optic taps further comprises a fiber optic splitter carried by said tap housing.

6. An aerial fiber optic cable system according to claim 1 further comprising a second sub-distribution fiber optic system extending along the aerial route in a second direction opposite the first direction.

7. An aerial fiber optic cable system according to claim 1 further comprising a plurality of spaced apart vertical support structures defining the aerial route and carrying said distribution fiber optic cable and said first sub-distribution fiber optic system.

8. An aerial fiber optic cable system according to claim 1 further comprising a respective optical network unit connected to each drop fiber optic cable.

9. An aerial fiber optic cable system comprising:
    a distribution fiber optic cable extending along an aerial route;
    at least one fiber optic splice enclosure connected to said distribution fiber optic cable along the aerial route; and
    a first sub-distribution fiber optic system extending along the aerial route in a first direction away from said at least one fiber optic splice enclosure and comprising
        a plurality of spaced apart fiber optic taps along the aerial route, each tap comprising a tap housing and a plurality of tap fiber optic connectors carried thereby,
        a first sub-distribution fiber optic cable extending along the aerial route between said at least one fiber optic splice enclosure and a first one of said fiber optic taps, and
        at least one second sub-distribution fiber optic cable extending along the aerial route between adjacent fiber optic taps so that said first sub-distribution fiber optic cable and said at least one second sub-distribution fiber optic cable are arranged in end-to-end relation,
        said first sub-distribution fiber optic cable and said at least one second sub-distribution fiber optic cable each comprising a pre-connectorized fiber optic cable.

10. An aerial fiber optic cable system according to claim 9 wherein said first sub-distribution fiber optic system further comprises at least one drop fiber optic cable extending away from the aerial route at at least one of said fiber optic taps.

11. An aerial fiber optic cable system according to claim 10 wherein each of said plurality of fiber optic taps comprises:
    an input fiber optic connector for coupling to a preceding sub-distribution fiber optic cable;
    an output fiber optic connector for coupling to a succeeding sub-distribution fiber optic cable; and
    a plurality of drop fiber optic connectors for coupling to respective drop fiber optic cables.

12. An aerial fiber optic cable system according to claim 11 wherein each of said fiber optic taps further comprises a splitter carried by said tap housing.

13. An aerial fiber optic cable system according to claim 9 further comprising a second sub-distribution fiber optic system extending along the aerial route in a second direction opposite the first direction.

14. An aerial fiber optic cable system according to claim 9 further comprising a plurality of spaced apart vertical support structures defining the aerial route and carrying said distribution fiber optic cable and said first sub-distribution fiber optic system.

15. An aerial fiber optic cable system comprising:
    a distribution fiber optic cable extending along an aerial route;
    at least one fiber optic splice enclosure connected to said distribution fiber optic cable along the aerial route;
    a forward sub-distribution fiber optic system extending along the aerial route in a forward direction away from said at least one fiber optic splice enclosure; and
    a backward sub-distribution fiber optic system extending along the aerial route in a backward direction;

each of said forward and backward sub-distribution fiber optic systems comprising at least one fiber optic tap along the aerial route, and a first sub-distribution fiber optic cable extending along the aerial route between said at least one fiber optic splice enclosure and a first fiber optic tap.

16. An aerial fiber optic cable system according to claim 15 wherein each of said forward and backward sub-distribution fiber optic systems further comprises at least one drop fiber optic cable extending away from the aerial route at at least one of said fiber optic taps.

17. An aerial fiber optic cable system according to claim 16 wherein said tap fiber optic connectors comprise:
an input fiber optic connector for coupling to a preceding sub-distribution fiber optic cable;
an output fiber optic connector for coupling to a succeeding sub-distribution fiber optic cable; and
a plurality of drop fiber optic connectors for coupling to respective drop fiber optic cables.

18. An aerial fiber optic cable system according to claim 17 wherein each of said fiber optic taps further comprises a splitter carried by said tap housing.

19. An aerial fiber optic cable system according to claim 15 further comprising a plurality of spaced apart vertical support structures defining the aerial route and carrying said distribution fiber optic cable and said forward and backward sub-distribution fiber optic systems.

20. An aerial fiber optic cable system comprising:
a distribution fiber optic cable extending along an aerial route;
at least one fiber optic splice enclosure connected to said distribution fiber optic cable along the aerial route; and
a lateral sub-distribution fiber optic system extending outwardly from the aerial route in a lateral direction away from said at least one splice enclosure and comprising
a plurality of spaced apart fiber optic taps, each tap comprising a tap housing and a plurality of tap fiber optic connectors carried thereby,
a first lateral sub-distribution fiber optic cable extending between said at least one splice enclosure and a first one of said fiber optic taps, and
at least one second lateral sub-distribution fiber optic cable extending between adjacent fiber optic taps so that said first lateral sub-distribution fiber optic cable and said at least one second lateral sub-distribution fiber optic cable are arranged in end-to-end relation,
said first lateral sub-distribution fiber optic cable and said at least one second lateral sub-distribution fiber optic cable each comprising a pre-connectorized fiber optic cable.

21. An aerial fiber optic cable system according to claim 20 wherein said lateral sub-distribution fiber optic system further comprises at least one drop fiber optic cable extending away from at least one of said fiber optic taps.

22. An aerial fiber optic cable system according to claim 21 wherein each of said plurality of fiber optic taps comprises:
an input fiber optic connector for coupling to a preceding lateral sub-distribution fiber optic cable;
an output fiber optic connector for coupling to a succeeding lateral sub-distribution fiber optic cable; and
a plurality of drop fiber optic connectors for coupling to respective drop fiber optic cables.

23. An aerial fiber optic cable system according to claim 22 wherein each of said fiber optic taps further comprises a splitter carried by said tap housing.

24. A method for installing an aerial fiber optic cable system comprising:
installing a fiber optic distribution cable along an aerial route;
connecting at least one fiber optic splice enclosure to the fiber optic distribution cable along the aerial route; and
installing a first fiber optic sub-distribution system extending along the aerial route in a first direction away from the at least one fiber optic splice enclosure by
installing a plurality of spaced apart fiber optic taps along the aerial route,
installing a first sub-distribution fiber optic cable extending along the aerial route between the at least one fiber optic splice enclosure and a first one of the fiber optic taps,
installing at least one second sub-distribution fiber optic cable extending between adjacent fiber optic taps so that the first sub-distribution fiber optic cable and the at least one second sub-distribution fiber optic cable are arranged in end-to-end relation, and
installing at least one drop fiber optic cable extending outwardly from the aerial route at at least one of the fiber optic taps.

25. A method according to claim 24 further comprising adding at least one drop fiber optic cable to the first fiber optic sub-distribution system after an initial installation.

26. A method according to claim 24 wherein each of the first and at least one second sub-distribution fiber optic cables comprises a pre-connectorized fiber optic cable.

27. A method according to claim 25 wherein each of the fiber optic taps comprises:
a tap housing;
an input fiber optic connector carried by the tap housing for coupling to a preceding sub-distribution fiber optic cable;
an output fiber optic connector carried by the tap housing for coupling to a succeeding sub-distribution fiber optic cable; and
a plurality of drop fiber optic connectors carried by tap housing for coupling to respective drop fiber optic cables.

28. A method according to claim 27 wherein each of the fiber optic taps further comprises a fiber optic splitter carried by the tap housing.

29. A method according to claim 24 further comprising installing a second sub-distribution fiber optic system extending along the aerial route in a second direction opposite the first direction.

30. A method according to claim 24 wherein the distribution fiber optic cable is carried by a plurality of spaced apart vertical support structures; and further comprising connecting the first sub-distribution fiber optic system to the plurality of spaced apart vertical support structures.

31. A method according to claim 24 further comprising installing a respective optical network unit to each drop fiber optic cable.

32. A method for installing an aerial fiber optic cable system comprising:
installing a fiber optic distribution cable along an aerial route;
connecting at least one fiber optic splice enclosure to the fiber optic distribution cable along the aerial route;
installing a forward sub-distribution fiber optic system extending along the aerial route in a forward direction away from the at least one fiber optic splice enclosure; and installing a backward sub-distribution fiber optic system extending along the aerial route in a backward direction;

wherein installing the forward sub-distribution fiber optic system and installing the backward sub-distribution fiber optic system each comprises installing at least one fiber optic tap along the aerial route, and installing a first sub-distribution fiber optic cable extending along the aerial route between the at least one fiber optic splice enclosure and a first fiber optic tap.

33. A method according to claim 32 wherein each of the forward and backward sub-distribution fiber optic systems comprises at least one drop fiber optic cable extending away from the aerial route at at least one of the fiber optic taps.

34. A method according to claim 32 wherein the first sub-distribution fiber optic cable comprises a pre-connectorized fiber optic cable.

35. A method according to claim 33 wherein the plurality of tap fiber optic connectors comprises:

an input fiber optic connector for coupling to a preceding sub-distribution fiber optic cable;

an output fiber optic connector for coupling to a succeeding sub-distribution fiber optic cable; and a plurality of drop fiber optic connectors for coupling to respective drop fiber optic cables.

36. A method according to claim 34 wherein each of said fiber optic taps further comprises a splitter carried by said tap housing.

37. A method according to claim 32 wherein the distribution fiber optic cable is carried by a plurality of spaced apart vertical support structures defining the aerial route; and further comprising connecting the forward and backward sub-distribution fiber optic systems to the plurality of spaced apart vertical support structures.

38. A method for installing an aerial fiber optic cable system comprising:

connecting at least one fiber optic splice enclosure to a fiber optic distribution cable along an aerial route; and installing a first fiber optic sub-distribution system extending along the aerial route in a first direction away from the at least one fiber optic splice enclosure by installing a plurality of spaced apart fiber optic taps along the aerial route, installing a first sub-distribution fiber optic cable extending along the aerial route between the at least one fiber optic splice enclosure and a first one of the fiber optic taps, installing at least one second sub-distribution fiber optic cable extending between adjacent fiber optic taps so that the first sub-distribution fiber optic cable and the at least one second sub-distribution fiber optic cable are arranged in end-to-end relation, and installing at least one drop fiber optic cable extending outwardly from the aerial route at at least one of the fiber optic taps.

39. A method according to claim 38 further comprising adding at least one drop fiber optic cable to the first fiber optic sub-distribution system after an initial installation.

40. A method according to claim 38 wherein each of the first and at least one second sub-distribution fiber optic cables comprises a pre-connectorized fiber optic cable.

41. A method according to claim 39 wherein each of the fiber optic taps comprises:

a tap housing;

an input fiber optic connector carried by the tap housing for coupling to a preceding sub-distribution fiber optic cable;

an output fiber optic connector carried by the tap housing for coupling to a succeeding sub-distribution fiber optic cable; and a plurality of drop fiber optic connectors carried by tap housing for coupling to respective drop fiber optic cables.

42. A method according to claim 41 wherein each of the fiber optic taps further comprises a fiber optic splitter carried by the tap housing.

43. A method for installing an aerial fiber optic cable system comprising:

connecting at least one fiber optic splice enclosure to a fiber optic distribution cable along an aerial route;

installing a forward sub-distribution fiber optic system extending along the aerial route in a forward direction away from the at least one fiber optic splice enclosure; and installing a backward sub-distribution fiber optic system extending along the aerial route in a backward direction;

wherein installing the forward sub-distribution fiber optic system and installing the backward sub-distribution fiber optic system each comprises installing at least one fiber optic tap along the aerial route, and installing a first sub-distribution fiber optic cable extending along the aerial route between the at least one fiber optic splice enclosure and a first fiber optic tap.

44. A method according to claim 43 wherein each of the forward and backward sub-distribution fiber optic systems comprises at least one drop fiber optic cable extending away from the aerial route at at least one of the fiber optic taps.

45. A method according to claim 39 wherein the first sub-distribution fiber optic cable comprises a pre-connectorized fiber optic cable.

46. A method according to claim 44 wherein the plurality of tap fiber optic connectors comprises:

an input fiber optic connector for coupling to a preceding sub-distribution fiber optic cable;

an output fiber optic connector for coupling to a succeeding sub-distribution fiber optic cable; and a plurality of drop fiber optic connectors for coupling to respective drop fiber optic cables.

47. A method according to claim 46 wherein each of said fiber optic taps further comprises a splitter carried by said tap housing.

48. A method for installing an aerial fiber optic cable system comprising:

connecting at least one fiber optic splice enclosure to a fiber optic distribution cable along an aerial route; and installing a lateral fiber optic sub-distribution system extending outwardly from the aerial route in a lateral direction away from the at least one fiber optic splice enclosure by installing a plurality of spaced apart fiber optic taps, installing a first lateral sub-distribution fiber optic cable extending between the at least one fiber optic splice enclosure and a first one of the fiber optic taps, and installing at least one second lateral sub-distribution fiber optic cable extending between adjacent fiber optic taps so that the first lateral sub-distribution fiber optic cable and the at least one second lateral sub-distribution fiber optic cable are arranged in end-to-end relation, the first lateral sub-distribution fiber optic cable and the at least one second lateral sub-distribution fiber optic cable each comprising a pre-connectorized fiber optic cable.

49. A method according to claim 48 further comprising adding at least one drop fiber optic cable to the lateral fiber optic sub-distribution system after an initial installation.

50. A method according to claim 49 wherein each of the fiber optic taps comprises:

a tap housing;

an input fiber optic connector carried by the tap housing for coupling to a preceding lateral sub-distribution fiber optic cable;

an output fiber optic connector carried by the tap housing for coupling to a succeeding lateral sub-distribution fiber optic cable; and a plurality of drop fiber optic connectors carried by tap housing for coupling to respective drop fiber optic cables.

51. A method according to claim 50 wherein each of the fiber optic taps further comprises a fiber optic splitter carried by the tap housing.

* * * * *